United States Patent
Zhang et al.

(10) Patent No.: US 7,940,794 B2
(45) Date of Patent: May 10, 2011

(54) DYNAMIC CHANNEL BANDWIDTH MANAGEMENT

(75) Inventors: Ning Zhang, Santa Clara, CA (US); Jeffrey M. Gilbert, Santa Clara, CA (US)

(73) Assignee: Atheros Communications, Inc., San Jose, CA (US)

( * ) Notice: Subject to any disclaimer, the term of this patent is extended or adjusted under 35 U.S.C. 154(b) by 1527 days.

(21) Appl. No.: 11/193,017

(22) Filed: Jul. 29, 2005

(65) Prior Publication Data

US 2006/0146869 A1 Jul. 6, 2006

Related U.S. Application Data

(60) Provisional application No. 60/638,495, filed on Dec. 22, 2004.

(51) Int. Cl.
*H04J 3/16* (2006.01)
*H04Q 7/28* (2006.01)
*H04B 1/38* (2006.01)

(52) U.S. Cl. ........ 370/468; 370/329; 370/341; 375/132; 375/219; 455/450; 398/69

(58) Field of Classification Search .......... 370/203–468; 375/132–219, 295–352; 348/584, 589; 345/472; 398/69; 455/450
See application file for complete search history.

(56) References Cited

U.S. PATENT DOCUMENTS

| | | | |
|---|---|---|---|
| 2005/0068922 A1 | 3/2005 | Jalali | |
| 2005/0180314 A1* | 8/2005 | Webster et al. | 370/208 |
| 2005/0190724 A1 | 9/2005 | Hansen et al. | |
| 2005/0243860 A1* | 11/2005 | Chen et al. | 370/465 |
| 2005/0288015 A1* | 12/2005 | Azizi et al. | 455/434 |
| 2006/0002361 A1 | 1/2006 | Webster et al. | |
| 2006/0182017 A1 | 8/2006 | Hansen et al. | |
| 2008/0084835 A1* | 4/2008 | Goel et al. | 370/310 |
| 2008/0284840 A1* | 11/2008 | Goodman et al. | 348/14.01 |

* cited by examiner

*Primary Examiner* — Afsar M. Qureshi
(74) *Attorney, Agent, or Firm* — Bever, Hoffman & Harms, LLP; Jeanette S. Harms

(57) ABSTRACT

To provide an extra wide bandwidth communication using standard channels, multiple non-overlapping channels can be used. To provide a 40 MHz communication, two non-overlapping 20 MHz channels, i.e. a control channel and an extension channel, can be used to provide an effective 40 MHz channel. Advantageously, a wireless device can dynamically detect 20/40 MHz signals on a packet-by-packet basis, thereby facilitating commercially viable 40 MHz communication. The wireless device can monitor traffic on the extension channel to facilitate accurate 20/40 MHz decision making. Protection, e.g. legacy preambles and RTS/CTS headers, can be provided on the control and extension channels.

30 Claims, 13 Drawing Sheets

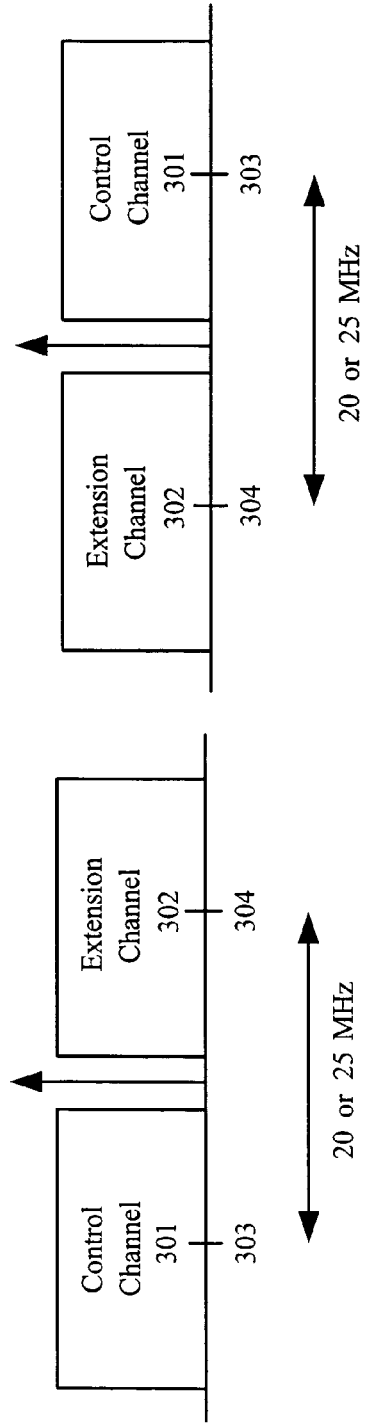
Figure 3A
Figure 3B
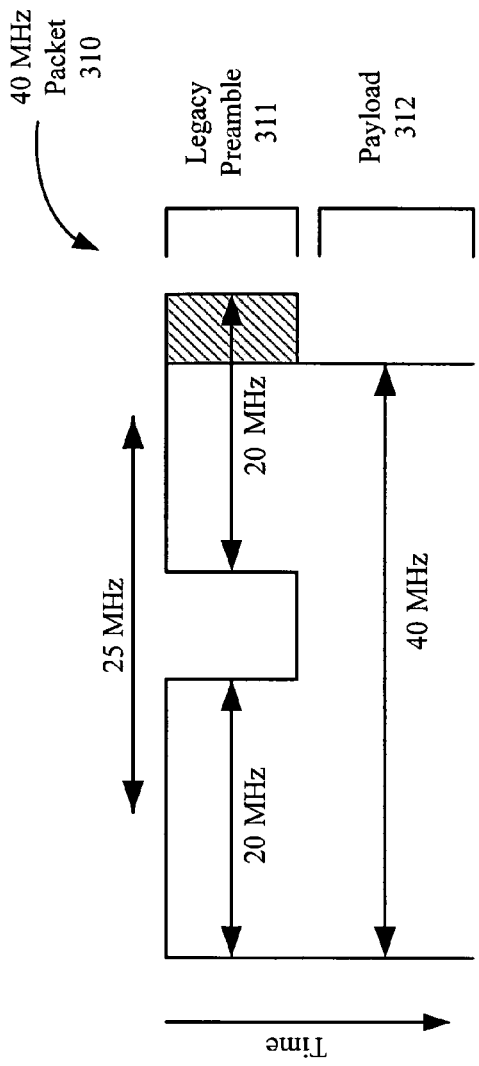
Figure 3C

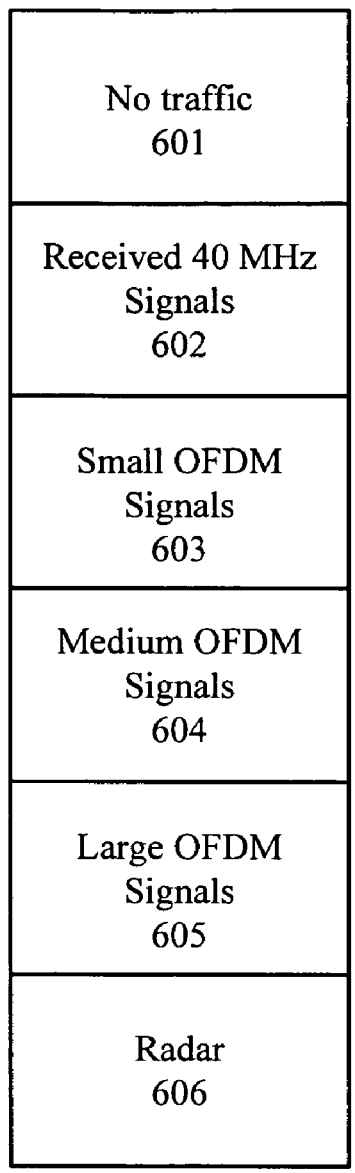
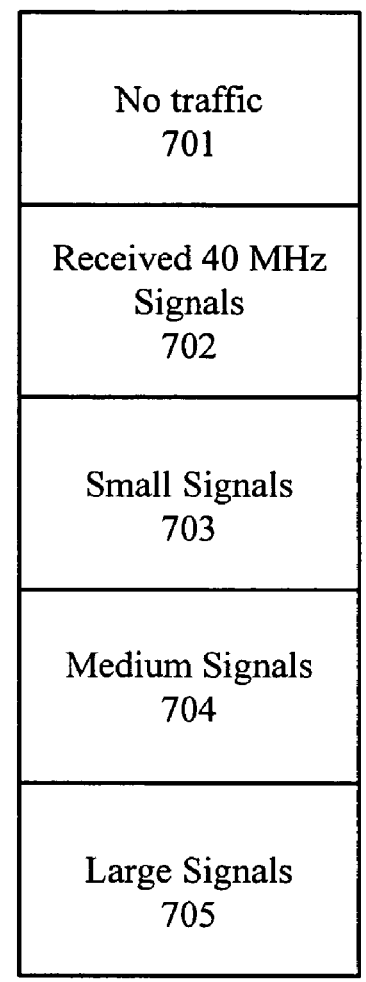
Figure 6
Figure 7

| Band | Monitoring Traffic | Protection | Radar Detection |
|---|---|---|---|
| 5 GHz | 802.11a OFDM signals monitored on extension channel | CCA performed; Legacy preambles provided on control and extension channels | Perform detection on control and extension channels independently |
| 2.4 GHz | 802.11g OFDM and CCK signals monitored on extension channel and extended channel | CCA performed; Legacy preambles or RTS/CTS headers provided on control and extension channels | No radar detection |

Figure 8

DYNAMIC CHANNEL BANDWIDTH MANAGEMENT

RELATED APPLICATIONS

This application claims priority of U.S. Provisional Patent Application 60/638,495, entitled "Dynamic 20/40 MHz Channel Management" filed Dec. 22, 2004.

BACKGROUND OF THE INVENTION

1. Field of the Invention

The present invention relates to radio frequency (RF) channel management and in particular to channel management in which both 20 MHz and 40 MHz packets may be sent.

2. Related Art

Radio systems use frequency division to ensure that different RF devices can function in different frequency ranges. In this manner, for example, a user's cell phone does not interfere with a government's satellite. These frequency ranges are called bands.

According to the IEEE 802.11 family of standards, which governs wireless communications, the 2.4 GHz frequency band includes 14 frequency channels. FIG. 1A illustrates these 14 channels, wherein each channel when occupied has a 22 MHz bandwidth and is centered on a predetermined frequency, i.e. the center frequency labeled in FIG. 1A (note that a channel does not have an exact edge and thus may spread beyond the edges of its shown boundaries). In this frequency band, the center frequencies of adjacent channels are 5 MHz apart. Note that channels 12-14 are not used in the United States (in FIG. 1A, the usable channels in the U.S. are indicated by solid contour lines). FIG. 1B illustrates the 12 channels (i.e. channels 34, 36, 38, 40, 42, 44, 46, 48, 52, 56, 60, and 64) provided in the 5 GHz band. In this frequency band, each channel is 20 MHz wide, and the center frequencies of adjacent channels in the U.S. (which are indicated by solid contour lines) are 20 MHz apart.

Notably, using a wider channel could advantageously increase capacity, i.e. the transfer rate. For example, FIG. 2 illustrates a graph 200 that indicates theoretical capacity limits can be directly increased when effecting increases in bandwidth. Specifically, a 40 MHz channel (indicated by a curve 202) always has greater capacity than a 20 MHz channel (indicated by a curve 201), and increasingly so as the signal to noise ratio (SNR) increases. Unfortunately, 40 MHz channels are not currently permitted in some regions, such as Japan and Europe. Additionally, legacy devices in other countries, e.g. the United States, also rely on 20 MHz channels.

Therefore, a need arises to effectively provide 40 MHz communication using 20 MHz channels. A further need arises to efficiently provide and manage this 40 MHz communication.

SUMMARY OF THE INVENTION

To provide an extra wide bandwidth communication using standard channels, multiple non-overlapping channels (also called a channel set herein) can be used. In one embodiment discussed in greater detail, to provide a 40 MHz communication, two non-overlapping 20 MHz channels, i.e. a control channel and an extension channel, can be used to provide an effective 40 MHz channel.

A transmitter can explicitly queue its packets as either 20 MHz or 40 MHz. In one embodiment, packets queued as 40 MHz could not be transmitted as 20 MHz. In another embodiment, a packet queued as 40 MHz could be timed-out (due to exceeding a predetermined waiting-for-transmission time or encountering a busy/noisy extension channel) and then transmitted as a 20 MHz packet. In accordance with one aspect of the invention, a receiver can advantageously dynamically detect 20/40 MHz signals on a packet-by-packet basis, thereby facilitating commercially viable 40 MHz communication.

In one embodiment, to provide channel management in the 5 GHz band, the 802.11a OFDM traffic from other networks can be monitored on the extension channel to avoid stomping (i.e. transmitting so as to disrupt an existing communication). The control channel can be any valid 5 GHz channel (e.g. channels 36, 40, 44, 48, 52, 56, 60 and 64 in the United States). The extension channel can be selected as +/−20 MHz from the control channel. Traffic statistics as well as interference event records can be aggregated by hardware and then provided to software to improve 20/40 MHz decision making. For protection, legacy preambles can be transmitted on the control and extension channels before the 40 MHz payload is sent. In one embodiment, radar detection and avoidance can be performed independently on the control and extension channels.

To provide channel management in the 2.4 GHz band, the 802.11g OFDM and 802.11b DSSS/CCK traffic from other networks can be monitored on the extension channel (20 MHz away from the control channel) as well as the channel next to the extension channel (also called an extended channel) to avoid stomping. The control channel can be any valid 2.4 GHz band (e.g. channels 1-11 in the United States). The extension channel can be selected as +/−20 MHz from the control channel (which corresponds to "+" or "−" 4 channels) or as +/−25 MHz (which corresponds to "++" or "−−" 5 channels). Note that typical 802.11b/802.11g networks are deployed on channels 1, 6, and 11, which are 25 MHz apart. In one embodiment, the PHY layer can monitor the traffic on both the extension channel as well as the extended channel (e.g. if the control channel is channel 1, then the traffic on both channels 5 and 6 can be monitored).

The statistics generated by this monitoring can be delivered to the software for analysis. Based on this analysis, the software can set the PHY layer to use one of 20 MHz and 25 MHz spacing for the 40 MHz communication or can determine the appropriate communication bandwidth (e.g. by re-queueing). In one embodiment, these statistics can be passed to software based on a software request. In another embodiment, the statistics can be automatically and periodically passed to software.

Protection can include sending legacy preambles and RTS (request to send)/CTS (clear to send) signals (e.g. 802.11b signals) on both the control and extension channels before transmitting 40 MHz packets. Note that the 40 MHz payload is always transmitted in a single contiguous spectrum. In contrast, protection headers can be 20-25 MHz away from the channel center depending on the results of the traffic monitoring. In one embodiment, the AP (access point) of the network can determine the appropriate 20-25 MHz spacing. In another embodiment, this determination can also include feedback from stations in the network.

In the 2.4 GHz band, interferences on the extension channel can be monitored (and thus avoided). These interferences could include narrowband signals (e.g. Bluetooth, microwave and processor noise) as well as signals wider than 20 MHz (e.g. memory bus noise).

BRIEF DESCRIPTION OF THE FIGURES

FIGS. 3A and 3B illustrate the configurations of two adjacent channels, called the control channel and the extension channel, that can be used to provide an effective 40 MHz channel.

FIG. 3C illustrates the relationship between the legacy preambles, which can be provided on the control and extension channels for protection, and the payload.

FIGS. 6 and 7 illustrate exemplary categories of traffic statistics for 5 GHz and 2.4 GHz bands, respectively.

FIG. 8 illustrates a table that summarizes exemplary characteristics of the dynamic 20/40 MHz method/device described herein.

DETAILED DESCRIPTION OF THE FIGURES

Using a 40 MHz channel could significantly increase capacity compared to using a 20 MHz channel. However, 40 MHz channels are not permitted in either Japan or Europe. Moreover, legacy devices in other countries, e.g. the United States, rely on 20 MHz channels.

Therefore, to provide 40 MHz communication, non-overlapping 20 MHz channels can be used to provide an effective 40 MHz channel. A known method to facilitate this communication includes designating specific periods when either 20 MHz or 40 MHz communication can take place. For example, during a first period only 20 MHz communication can take place whereas during a second period only 40 MHz communication can take place. Another known method includes sending out a beacon to "quiet" both channels, i.e. ensure that other devices do not use the identified channels. These methods, although implementable, have significant limitations due to complexity and/or reduced performance, thereby limiting their commercial applicability.

Figure 1A:
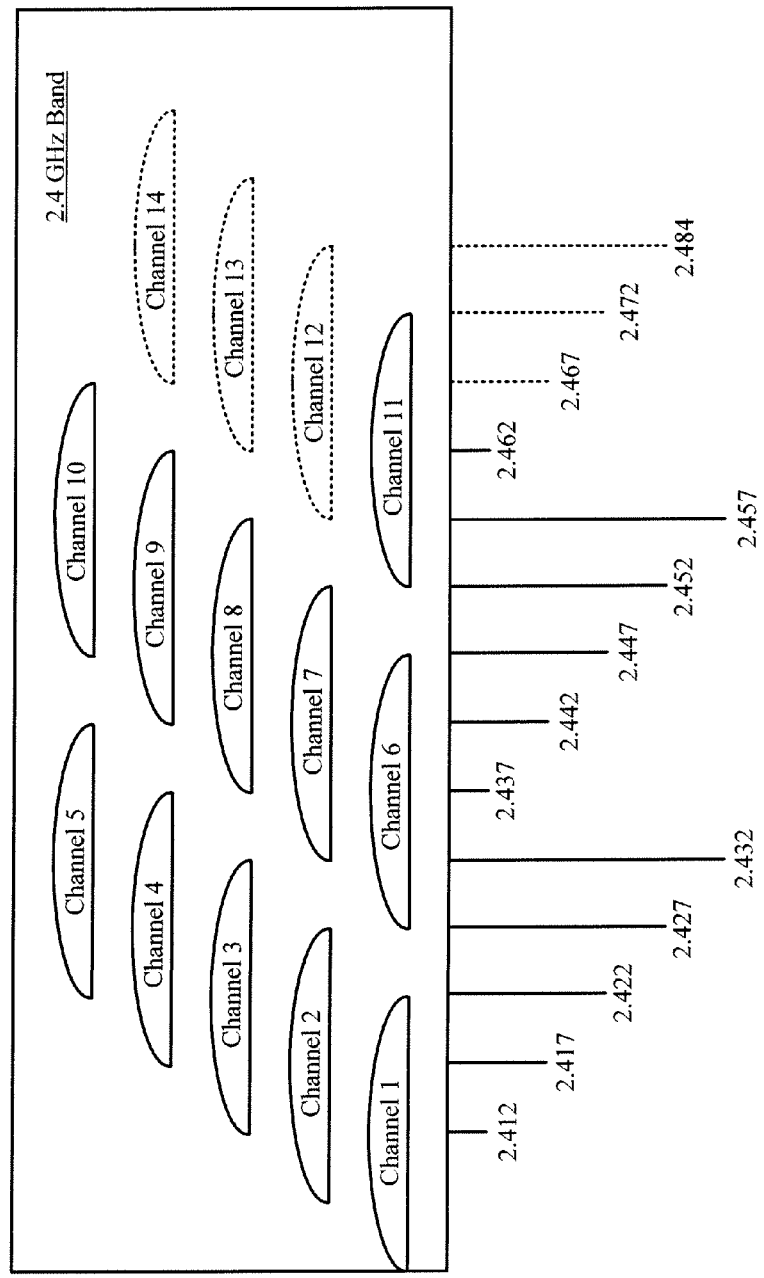
FIG. 1A illustrates channels 1-14 comprising the 2.4 GHz band.
Figure 1B:
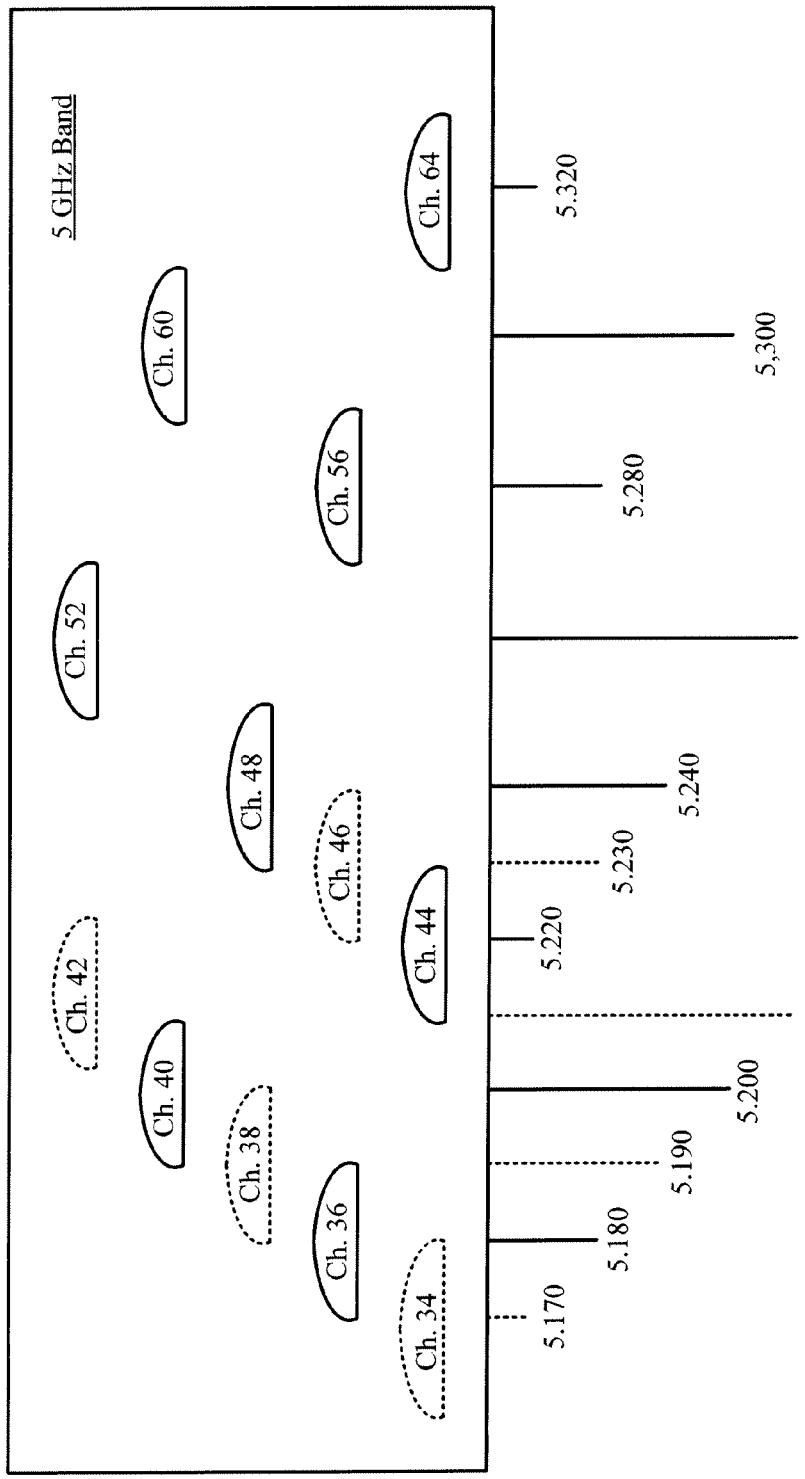
FIG. 1B illustrates channels 34-64 comprising the 5 GHz band.
Figure 2:
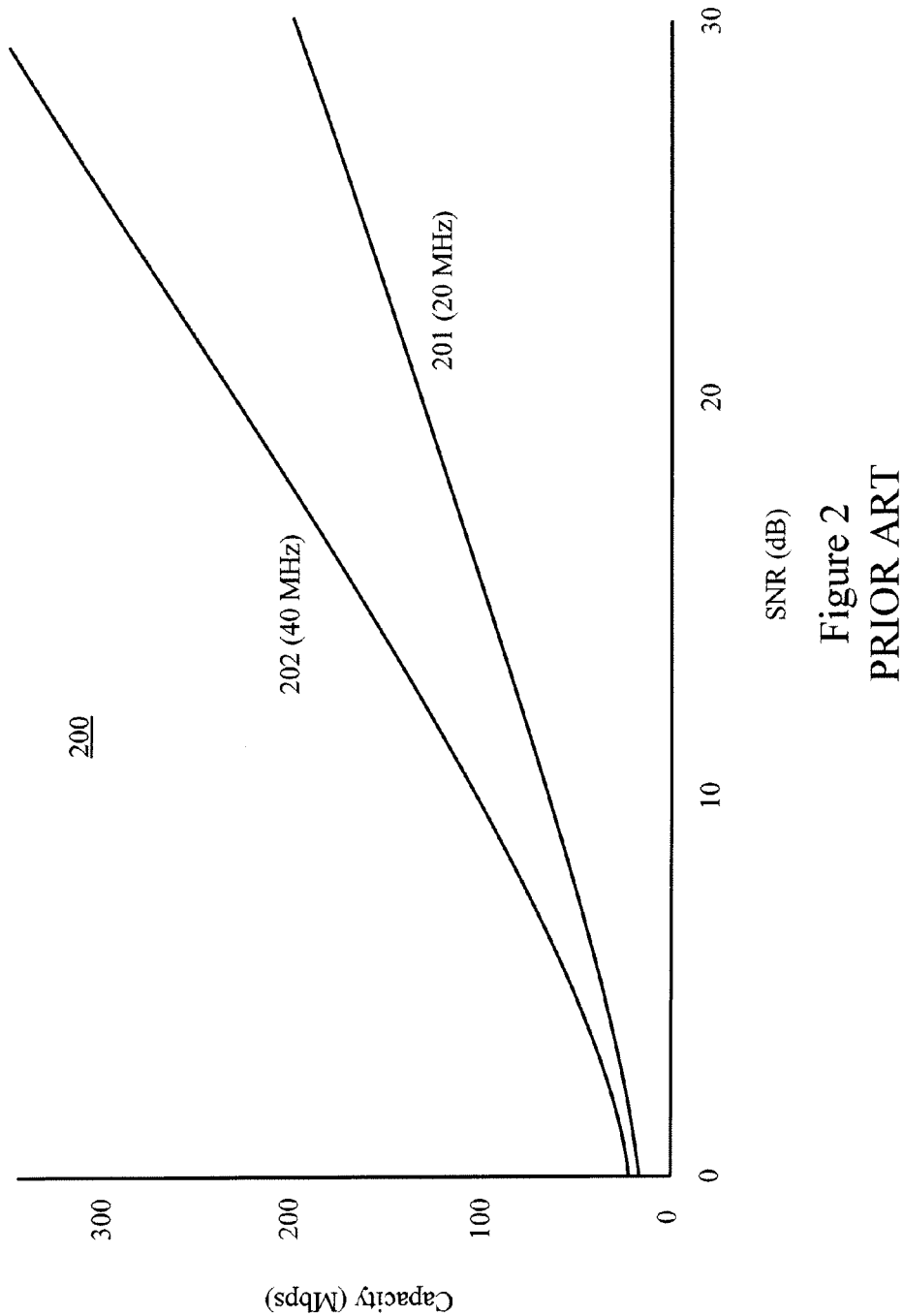
FIG. 2 illustrates a graph that indicates theoretical capacity limits can be directly increased when effecting increases in bandwidth.

FIG. 3A illustrates two non-overlapping channels, i.e. a control channel 301 and an extension channel 302. A carrier frequency 305, which can be used to tune a synthesizer in the transceiver, can be designated as the frequency halfway between center frequencies 303 and 304 of control channel 301 and extension channel 302, respectively. Note that extension channel 302 in FIG. 3A is "above" that of control channel 301. Thus, for example and also referring back to FIG. 1, channel 6 could implement the control channel whereas channel 11 could implement the extension channel. In another embodiment shown in FIG. 3B, extension channel 302 could be "below" that of control channel 301. In this example, channel 6 could implement the control channel whereas channel 1 could implement the extension channel.

Notably, center frequency 303 of control channel 301 can be 20-25 MHz from center frequency 304 of extension channel 302. For example, in the 2.4 GHz band, a channel set appropriate for 40 MHz traffic could be 4 or 5 channels apart (which corresponds to 20 or 25 MHz apart). Thus, in one communication, channels 6 and 10 (4 channels or 20 MHz apart) could be used, whereas in another communication channels 6 and 11 (5 channels or 25 MHz apart) could be used.

Note that the actual payload of a 40 MHz packet is a continuous 40 MHz (in one actual implementation 37 MHz) with no frequency gap or, in one preferred embodiment, with a minimal frequency gap (e.g. a small gap, for example 3 carriers wide, can be added to mitigate DC offset and carrier leak sensitivities). In accordance with one aspect of the invention, a legacy preamble can be provided on each of control channel 301 and extension channel 302, wherein each legacy preamble may need up to 20 MHz (e.g. in one embodiment, 17 MHz). Therefore, referring to FIG. 3C, a legacy preamble 311 of a 40 MHz packet 310 (assuming a 25 MHz spacing between legacy preamble portions) is wider than its payload 312 by 5 MHz (indicated by a cross-hatched section). This difference in total bandwidth poses significant challenges during packet detection, some solutions for which are described below.

In one embodiment, the selection of whether extension channel 302 is above or below control channel 301 can be static. That is, a basic service set (BSS) could transmit on a given control channel with the extension channel fixed to be above or below. This selection could be denoted by appending a "−" or a "+" after the channel number corresponding to an extension channel 20 MHz below or 20 MHz above the control channel. For example, in the 5.0 GHz band (see FIG. 1B), channel 52+ would have its control channel on 52 and its extension channel on 56 (i.e. the adjacent, non-overlapping channel above channel 52). In contrast, 52− would have its control channel on 52 and its extension channel on 48 (i.e. the adjacent, non-overlapping channel below channel 52). In the 2.4 GHz band (see FIG. 1A), the extension channel selection could be denoted using a "++", "−−", "+", or "−" corresponding to an extension channel 25 MHz above, 25 MHz below, 20 MHz above, or 20 MHz below, respectively. For example, channel 6++ would have its control channel on 6 and its extension channel on 11 (i.e. the adjacent, non-overlapping channel above channel 6 with 25 MHz spacing). In contrast, 6+ would have its control channel on 6 and its extension channel on 10 (i.e. the adjacent, non-overlapping channel above channel 6 with 20 MHz spacing).

Note that when a transmitter has a 40 MHz packet to transmit, the transmitter can perform CCA (clear channel assessment) (also called carrier sense) on the control and extension channels to ensure it will not stomp on other network communication. In one embodiment, CCA can include determining whether any signal (network or interference) above a predetermined power threshold is detected. Once the control and extension channels are determined to be clear, the transmitter can broadcast a request-to-send (RTS) packet, which includes information for the receiver. When the receiver receives the RTS packet, it can broadcast a clear-to-send (CTS) packet, which indicates that the receiver is within range and ready to receive data. A device other than the intended receiver that hears the RTS or the CTS packet refrains from sending any packets on that channel set for a predetermined interval of time, thereby reducing the possibility of packet collision on that channel set.

Figure 3D:
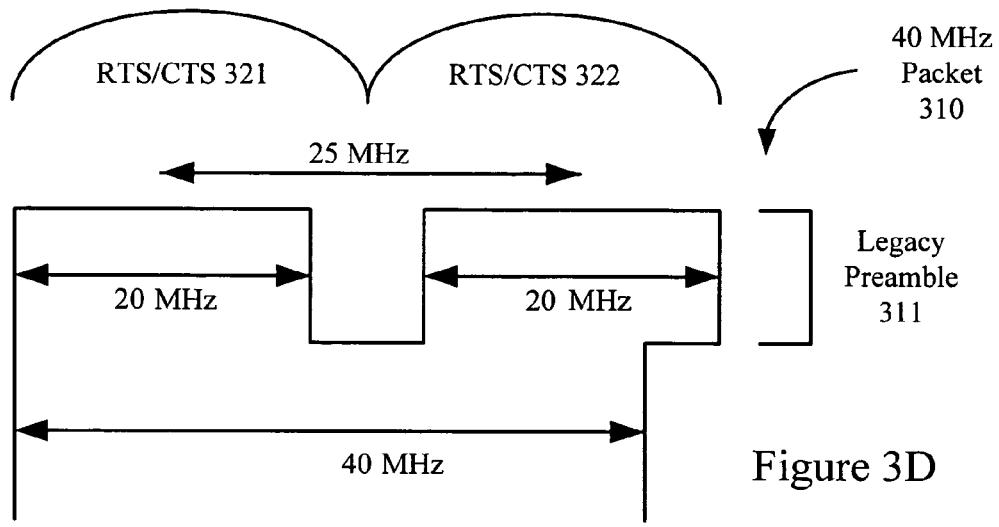
FIGS. 3D and 3E illustrate the configurations of RTS/CTS headers that can be provided on the control and extension channels for protection.
Figure 3E:
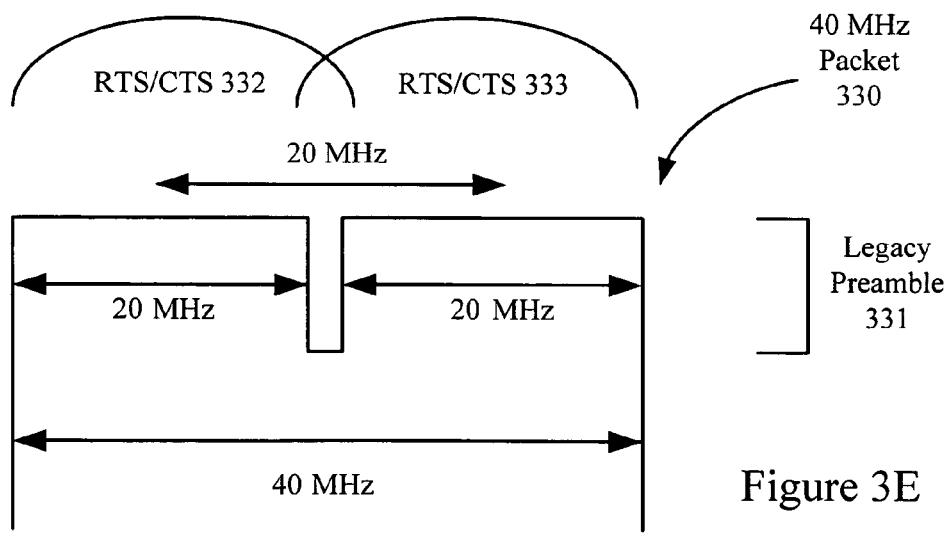

Both the RTS and CTS packets could use DSSS/CCK modulation (instead of OFDM modulation) that can be understood by 802.11b devices. For example, FIG. 3D illustrates 40 MHz packet 310 (25 MHz spacing in legacy preamble 311) preceded by RTS/CTS packets 321 and 322 with a combined bandwidth that protects legacy preamble 311. FIG. 3E illustrates a 40 MHz packet 330 (20 MHz spacing in legacy preamble 331) preceded by RTS/CTS packets 332 and 333 with a combined bandwidth that protects legacy preamble 331. Note that in this case, RTS/CTS packets 332 and 333 overlap, which is acceptable using DSSS/CCK modulation.

Figure 4A:
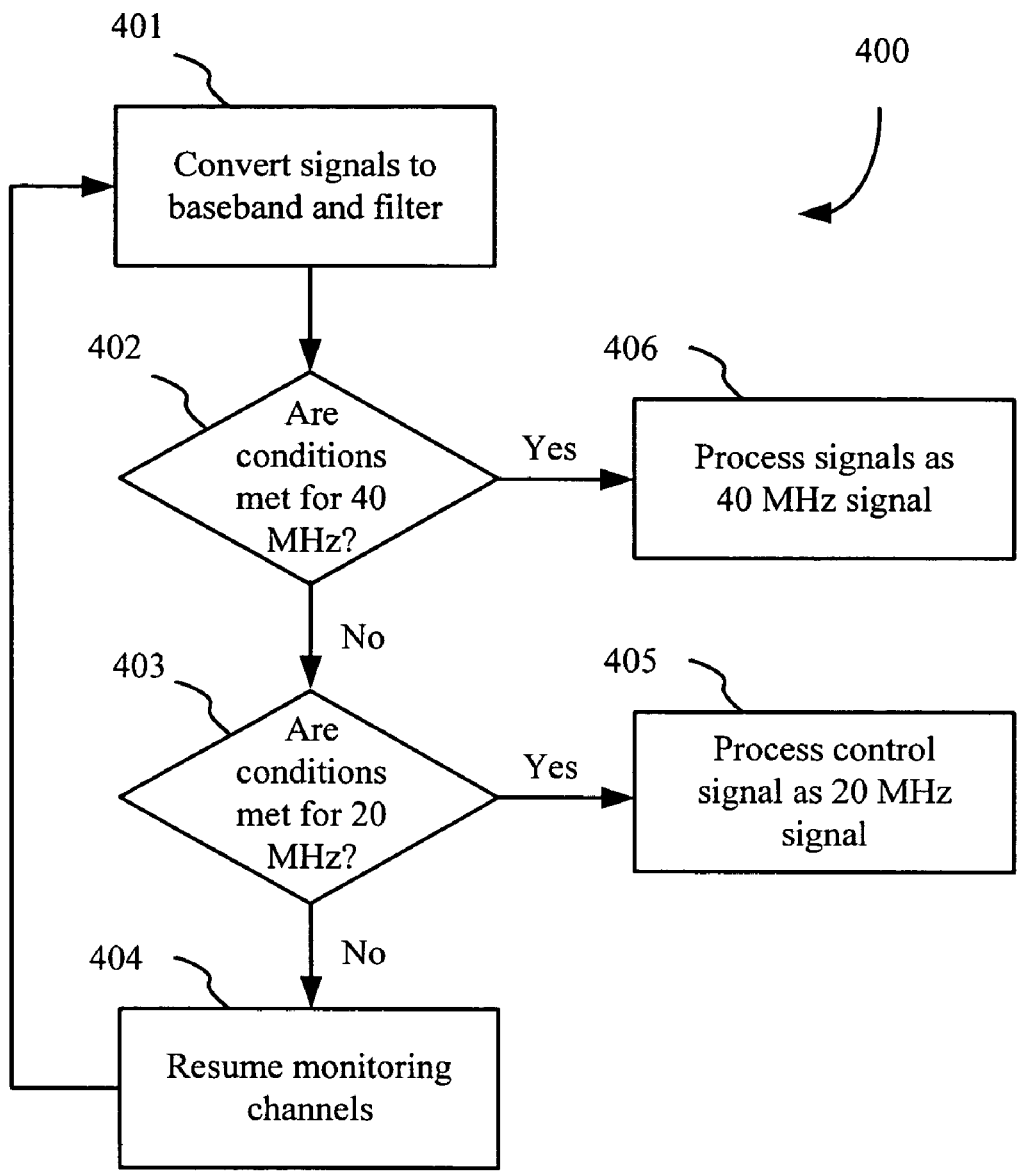
FIGS. 4A and 4B illustrate an exemplary method for dynamically receiving 20/40 MHz packets on a packet by packet basis.

FIG. 4A illustrates an exemplary packet-by-packet dynamic 20/40 MHz detection method 400 that can be used by a receiver. In method 400, step 401 can convert any signals on the control and extension channels to baseband frequency and then filter those signals. Step 402 can then determine whether the conditions for a 40 MHz packet are met. If these conditions are met, then step 406 can process the signals on the control and extension channels as a 40 MHz signal. If the initial conditions are not met, then step 403 can determine whether the conditions for a 20 MHz packet are met. (Note that these conditions are limited to the control channel because 20 MHz packets would not be sent on the extension channel.) If these conditions are not met, then step 404 can resume monitoring the control and extension channels and return to step 401. If the conditions for a 20 MHz signal are met, then step 405 can process the signal on the control channel as a 20 MHz signal).

Figure 4B:
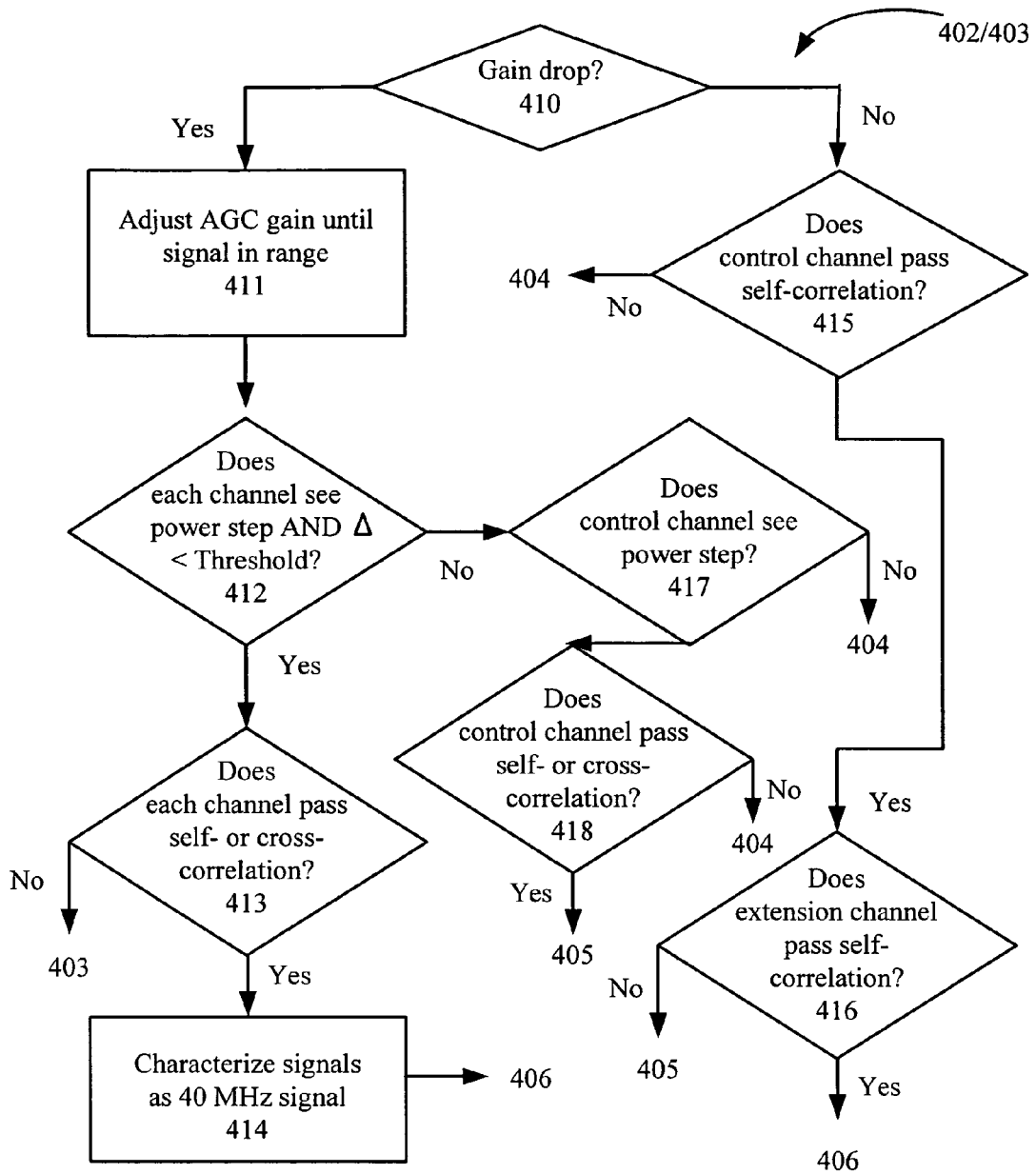

In general, if a 40 MHz packet is being sent, then the signals on the control and extension channels are sent substantially at the same time and have substantially the same strength (e.g. RSSI). FIG. 4B illustrates exemplary steps for steps 402/403 to determine if the conditions for a 20/40 MHz signal are met. Specifically, step 410 can determine if a gain drop occurs on one of the control and extension channels (thereby indicating a strong signal on at least one channel). Note that a gain drop can be triggered when the total power at an ADC output is above a predetermined coarse_high value (thereby triggering a coarse gain drop) or when the ADC saturates (thereby triggering a quick gain drop). For either type of gain drop, step 411 can change the gain of the AGC (automatic gain control) until that signal is in an acceptable range for that receiver.

At this point, step 412 can check the in-band signal power on each of the control and extension channels for a step proportional to the total power step. Specifically, step 412 can include measuring whether a power step over a predetermined time interval (e.g. 10-15 dB over 30-80 ns) occurs on each of the control and extension channels. If both channels see power steps and the power difference between the channels is below a threshold (e.g. which can be set by the maximum power difference between two 20 MHz bands under multipath channels), then the process can proceed to step 413. If not, then the process can proceed to step 417, which determines whether a power step occurs on the control channel. If so, then step 418 can use self- and/or cross-correlation to check for false detection on the control channel. If the control channel passes the correlation check, then the process can proceed to step 405, which processes the control signal as a 20 MHz signal. If either the control channel does not see a power step (step 417) or the control channel does not pass the correlation check (step 418), then the process can return to step 404 to resume monitoring.

In one embodiment, step 413 can use self- and/or cross-correlation to check for false detection on each channel. Specifically, in an OFDM preamble, twelve tones (complex sinusoidals) are spaced (peak to peak) at 1.25 MHz with a period of 0.8 µs. Each of ten short training symbols in this OFDM preamble has these twelve sub-carriers, thereby establishing an OFDM pattern. Therefore, the output will be fully periodic, even in multipath. Thus, looking for periodicity of 0.8 µs is very effective to find an OFDM preamble, even in conditions of low signal to noise ratio (SNR) and heavy multipath. Hence, self-correlation can be effectively used to check for false detection.

In contrast, in an 802.11b preamble (i.e. a SYNC signal), Barker signals (an 11-chip spreading code) are multiplied by either −1 or +1. However, the −1/+1 multiplication is applied in a similar manner, thereby establishing a DSSS pattern. Hence, the term "cross-correlation" is appropriate in describing CCK detection. U.S. patent application Ser. No. 10/698,666, entitled "Voting Block For Identifying WLAN Signal Modulation Type", filed on Oct. 31, 2003 by Atheros Communications, Inc. and incorporated by reference herein, describes these self- and cross correlation techniques in greater detail.

If at least one channel fails correlation, then the process proceeds to step 403 (see FIG. 4A). In one embodiment, step 403 can include (1) measuring whether a power step over a predetermined time interval (e.g. 10-15 dB over 30-80 ns) occurs on the control channel and (2) checking for self- or cross-correlation on the control channel. If both a power step occurs and that signal triggers one of self- and cross-correlation, then the signal on the control channel can be processed as a 20 MHz signal in step 405.

Referring back to step 413 (FIG. 4B), if both the control and extension channels pass correlation (i.e. one of self- and cross-correlation), then the signals on the control and extension channels can be characterized as a 40 MHz signal in step 414. At this point, the process can proceed to step 406 of processing the 40 MHz signal (see FIG. 4A).

If a gain drop is not triggered, thereby indicating weak signals on both channels, as determined in step 410, then step 415 can determine whether the signal on the control channel passes self-correlation. If not, then the process can proceed to step 404 (FIG. 4A). If the signal on the control channel passes self-correlation, then step 416 can determine whether the signal on the extension channel passes self-correlation.

In one embodiment, the signal on the extension channel can be tested for self-correlation within a time window. For example, if the signal on the control channel passes self-correlation at time $t_n$, then the time window ($t_{win}$) for determining self-correlation for the signal on the extension channel would be defined by $t_n-(t_{win}/2)$ and $t_n+(t_{win}/2)$. Note that the thresholds for triggering self-correlation could be different for the control and extension channels. For example, in one embodiment, the threshold for triggering self-correlation could be higher (e.g. 25% higher) for the control channel than for the extension channel. In one embodiment, if a signal on the extension channel arrives too far in advance of the signal on the control channel (i.e. it arrives outside the above-described time window), then the receiver can hold off looking for a 40 MHz signal for a predetermined time period because the current signal on the extension channel is probably a blocker signal.

If the signal on the extension channel (which is received within the time window) does not pass self-correlation, thereby indicating that the signal on the control channel is a 20 MHz signal, then the process can proceed to step 405 (FIG. 4A). If the signal on the extension channel does pass self-correlation, thereby indicating that the signals on the control and extension channels are a 40 MHz signal, then the process can proceed to step 405 (FIG. 4A).

Figure 4C:
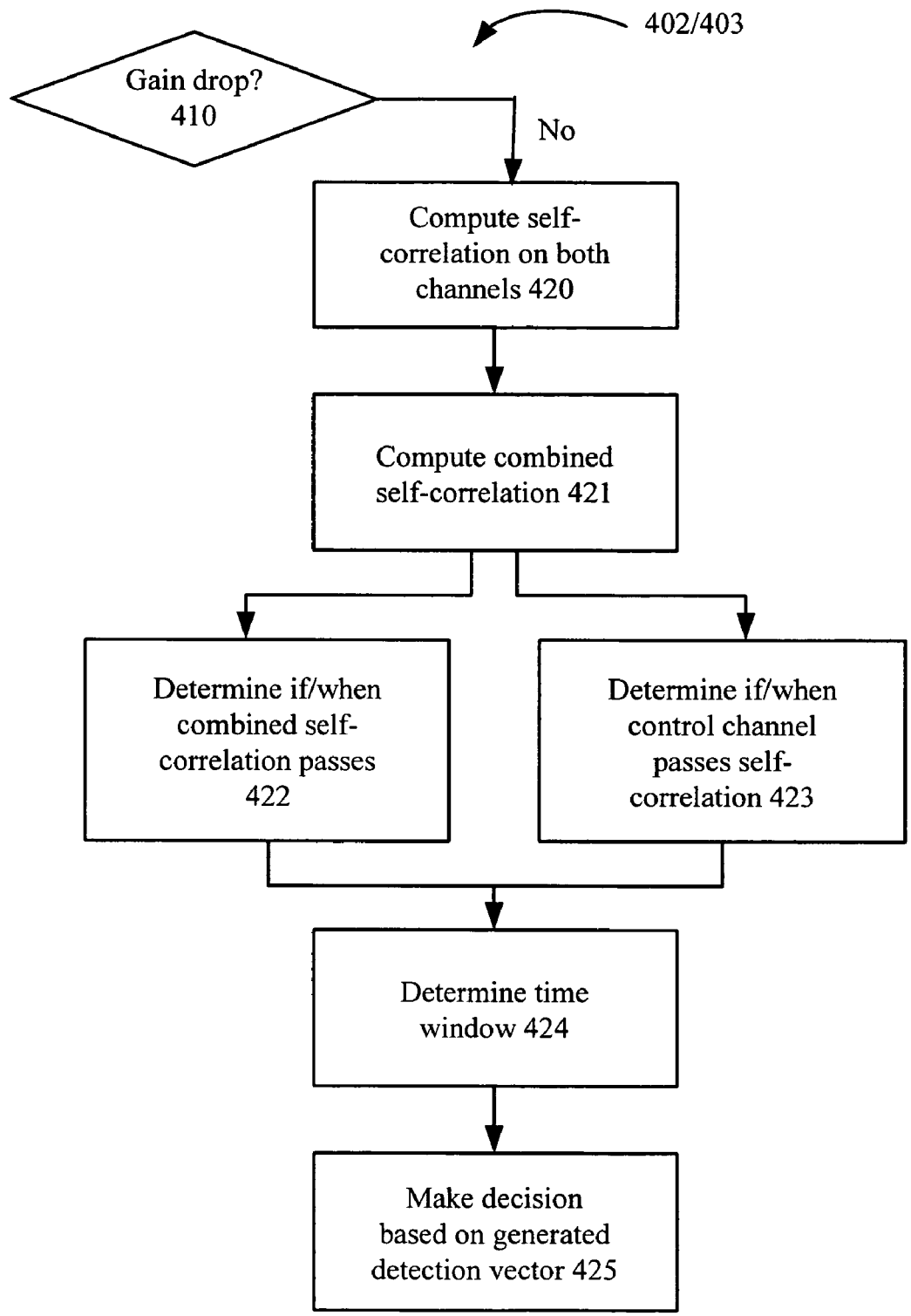
FIG. 4C illustrate another exemplary method for dynamically receiving 20/40 MHz packets on a packet by packet basis.

In another embodiment shown in FIG. 4C, assuming that the received signals are weak, step 420 can compute self-correlation on both channels using two detection logic units. In step 421, the combined self-correlation can be computed by either combining the self-correlation on the two channels equally or weighted by the ratio of the noise floor of the two channels. Step 422, can determine if/when the combined self-correlation passes. In parallel, step 422 can determine if/when the control channel passes self-correlation. Step 424 can determine the time window by using the time T from either step 422 or step 420, whichever is detected first. The time window can be used to check self-correlation on the extension channel, e.g. $(T-T_{win})/2$ to $(T+T_{win})/2$. Step 425 makes a detection decision based on a generated detection vector. In one embodiment, detection vector weak_det_vec= [D1 D2 D3], wherein D1 is the decision based control channel self-correlation, D2 is the decision based extension channel decision, and D3 is D1 and D2 combined. The following code provides an exemplary decision process.

```
if (weak_det_vec>0)==[000]
    no signal is found, keep on searching
elseif (wak_det_vec>0)==[001]
    detect 40 MHz packet, continue 40 MHz process
elseif (weak_det_vec>0)==[010]
    detect 20 MHz extension channel packet, go back searching
elseif (weak_det_vec>0)==[011]
    if (weak_det_vec(2)==1)&(weak_det_vec(3)==2)
        detect 40 MHz packet, continue 40 MHz process
    else
        detect 20 MHz extension channel packet, go back
            searching
    end
elseif (weak_det_vec>0)==[100]
    detect 20 MHz control channel packet, continue 20
        MHz process
elseif (weak_det_vec>0)==[101]
    if (weak_det_vec(1)==1)&(weak_det_vec(3)==2)
        detect 40 MHz packet, continue 40 MHz process
    else
        detect 20 MHz control channel packet, continue
            20 MHz process
    end
elseif (weak_det_vec>0)==[110]
    detect 40 MHz packet, continue 40 MHz process
end
```

In the case of either strong or weak signal detection, after a 40 MHz or a 20 MHz packet is detected, the automatic gain control (AGC) can further adjust its gain to ensure proper signal processing. In one embodiment, the receiver in the 20/40 MHz dynamic mode can run its ADC (analog digital converter) at 80 MHz for 5 GHz operation or at 88 MHz (interpolated to 80 MHz) for 2.4 GHz operation. Therefore, if a 20 MHz control channel packet is detected, then the 80 MHz signal from the ADC can be down-sampled to 40 MHZ for various estimations and demodulation. On the other hand, if a 40 MHz channel set packet is detected, then a 256-point FFT, fine timing and frequency estimation, channel estimation, and decoding can be performed on the 80 MHz signal.

For protection, the transmitter can perform a CCA (clear channel assessment) on the channel/channel set before transmission of the packets. For additional protection, the legacy preamble can be provided on the control and extension channels. In one embodiment for 2.4 GHz operation, a DSSS/CCK rate based request to send an (RTS)/clear to send (CTS) packet can also be sent on the control and extension channels before 40 MHz transmission. Note that an RTS/CTS packet, like the legacy preamble, could have 20 or 25 MHz spacing. In one embodiment, an access point (AP) can decide which spacing is appropriate. This decision could include feedback from stations within that AP network.

Channel management for dynamic packet-by-packet 20/40 MHz communication can advantageously include the collection of statistics, thereby enabling accurate 20/40 MHz decision making. In one embodiment, hardware can collect the statistics to be used by software to make the 20/40 MHz decision. Note that hardware/software from both the AP as well as the stations can be used in this decision-making process.

Signals on the extension channel can be monitored. This function can be performed when listening for 20/40 MHz packets and when decoding 20 MHz control channel packets (i.e. when not decoding 40 MHz packets). The extension channel monitoring can be done using one of or a combination of four methods, wherein the first and second methods provide general information on channel availability and the third and fourth method are directed to detection of 802.11a OFDM packets.

In the first method that can provide general information on channel availability, the power level above the noise floor on the extension channel is measured. In one embodiment, the heavily averaged (e.g. over 8 μs) in-band power level (RSSI) can be reported to software. This first method can advantageously detect all interference types, detect radar on the extension channel, and determine channel load (i.e. the percentage of busy time on the channel). In one embodiment, the first method can further include compiling statistics from performing CCA on the extension channel.

In the second method that can provide general information on channel availability, a spectrum of the extension channel can be measured. In one embodiment, the signal on the extension channel is rotated to baseband, filtered, and down-sampled and a 16-point (or, alternatively, a 32-point) FFT can be performed on that resulting baseband signal (e.g. 40 MHz twice over-sampled of extension channel that is 20 MHz) to sample the extension channel spectrum every 2.5 MHz (or, alternatively, every 1.25 MHz)). Note that the power of the FFT results can be heavily averaged to get the power spectrum. Thus, if the spectrum shows a 17 MHz wide signal on the extension channel when not decoding a 40 MHz packet, there is probably other OFDM traffic on the extension channel. These detection results can be sent to the software for further processing. This second method can advantageously detect and may distinguish different types of interference, identify 2.4 GHz blocker channels, and determine the channel load.

In the third method directed to detection of 802.11a OFDM packets, an OFDM preamble can be searched for on the extension channel. Specifically, potential signals on the extension channel can be rotated and filtered and then self-correlation can be performed on the resulting baseband signal. Thus, this third method essentially counts the number of 802.11a/g (OFDM) packet detections during a given time window. The detection results, e.g. the detection frequency, can be sent to the software for further processing. The third method can detect 801.a interference and detect radar on the extension channel.

In the fourth method directed to detection of OFDM packets, cyclic prefix correlation, which is well known in the wireless industry, can be performed in a sliding window manner. In this method, signals on the extension channel can be rotated and filtered and then cyclic prefix correlation can be performed over 0.8 μs baseband data separated by 3.2 μs (the period of the correlation peak being 4.0 μs). If this correlation shows periodic peaks with the 4.0 μs period when not decoding a 40 MHz packet, then there is other OFDM (i.e. 802.11a or 802.11g) traffic on the extension channel. In one embodiment, these correlation results can be coherently averaged (i.e. by adding both amplitude and phase) over multiple periods to improve the decision reliability. Because the correlation is based on the property of the entire payload of the OFDM packet, the correlation can also reflect the packet length. Note that multipath can corrupt the correlation results. The fourth method can detect 801.a/g OFDM interference, determine channel load, and detect radar on the extension channel.

The emerging 802.11n standard includes an option for half-guard interval OFDM data formats. In these packets, the 0.8 μs cyclic prefixes are replaced with truncated 0.4 μs prefixes. To detect half guard-interval 802.11n packets, the cyclic prefix correlation can instead be performed over 0.4 μs separated by 3.2 μs (the period of the correlation peak being 3.6 μs). To detect other, (e.g. turbo-mode) packets, the cyclic prefix correlation can be performed over 0.4 μs separated by 1.6 μs (the period of the correlation peak being 2 μs). In general, the fourth method can be used to detect any OFDM type packets with any guard interval length and any symbol period. For example, guard intervals of 0.8 μs or 0.4 μs as well as symbol periods of 7.2 μs or 6.8 μs (that is 6.4 μs (IFFT/FFT period)+guard interval). Thus, this fourth method can yield more information than the third method, i.e. the percentage of time the channel is occupied by 802.11 traffic during a given time window.

In one embodiment, radar detection can be performed on the control and extension channels separately. If radar is detected on the control channel, then the access point (AP) may need to switch the control channel. On the other hand, if radar is detected on the extension channel, then the AP needs to stop 40 MHz operation and check the availability of the extension channel on the other side of the control channel.

Radar detection algorithms can include power measurement, detection of non-802.11a traffic, and software-based periodicity calculations. U.S. patent application Ser. No. 10/884,785, entitled "Multiple Antenna Radar Signal Detection And Estimation", filed on Jul. 1, 2004 by Atheros Communications, Inc. and incorporated by reference herein, describes exemplary algorithms in greater detail. In general, short radars (e.g. on the order of 1 μs) can be detected by pulse detection whereas long radars can be detected by receiving any non-802.11a signal that is larger than a predetermined strength. This algorithm can be used on the control channel, but not on the extension channel because the power measurement does not trigger packet detection. Thus, the third or fourth methods can be used to distinguish radar pulses from 802.11a packets on the extension channel. Note that the second method also cannot be reliably used because radar is assumed to have unknown spectral properties.

Channel management in the 2.4 GHz band can be significantly more challenging than in 5 GHz band. Specifically, the channel spacing is 5 MHz instead of 20 MHz (see FIGS. 1A and 1B). Consequently, a non-overlapping extension channel that could be used for 40 MHz traffic could be 4 or 5 channels from the control channel (e.g. channel 1 could be the control channel and either channel 5 or channel 6 could be the extension channel).

Figure 5B:
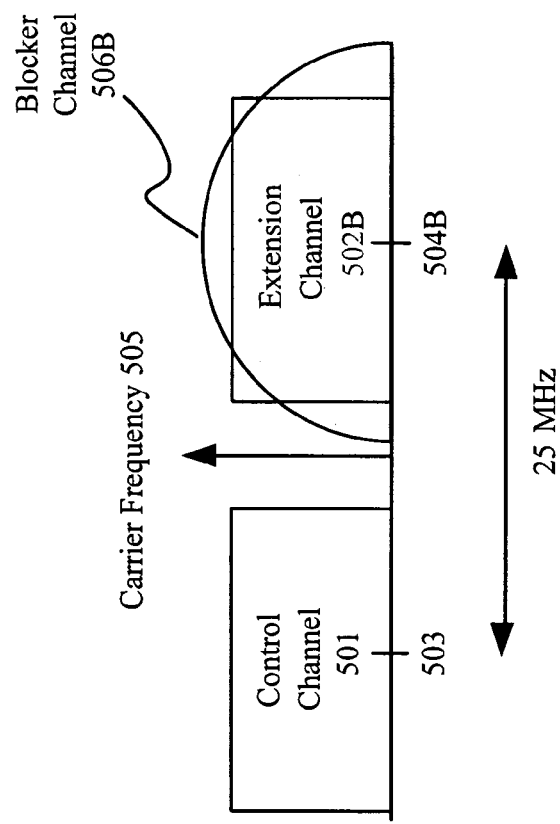
FIGS. 5A and 5B illustrate possible relationships between a blocker channel and an extension channel in the 2.4 GHz band.
Figure 5A:
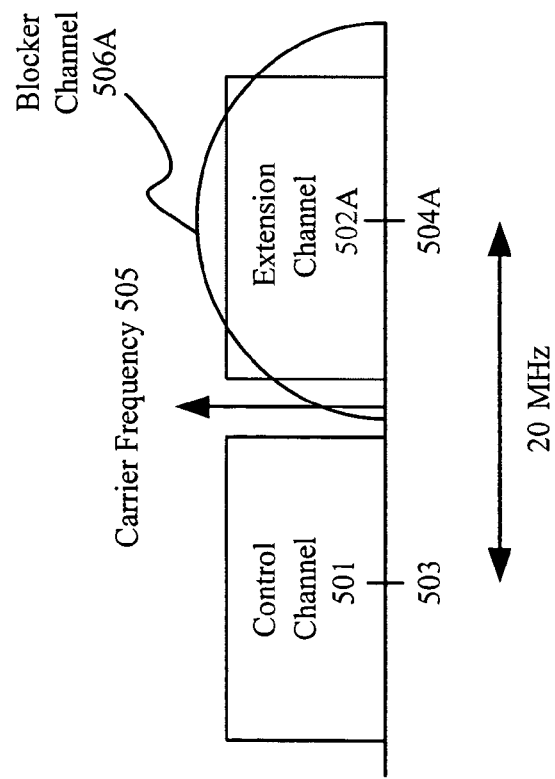

Therefore, the extension channel in the 2.4 GHz band could overlap with several blocker channels. A blocker channel can be any channel carrying traffic from another network that "stomps" on the traffic on the extension channel. Although any overlap of the blocker channel and the extension channel can prevent 40 MHz traffic, identical center frequencies of the blocker and extension channels are typically most egregious. For example, FIG. 5A illustrates a control channel 501, an extension channel 502A, and a blocker channel 506A, wherein a center frequency 503 of control channel 501 is 20 MHz apart from a center frequency 504A of extension channel 502A/blocker channel 506A. FIG. 5B illustrates control channel 501, an extension channel 502B, and a blocker channel 506B, wherein center frequency 503 of control channel 501 is 25 MHz apart from a center frequency 504B of extension channel 502B/extension channel 502B. Notably, both blocker channels 506A and 506B can prevent 40 MHz traffic by stomping on the traffic on either of extension channels 502A and 502B.

Moreover, in the 2.4 GHz band, both OFDM and DSSS/CCK packets may be transmitted on the extension channel (only OFDM would be transmitted in the 5 GHz band). Unfortunately, legacy 802.11b devices only understand DSSS/CCK packets. Yet further, in the 2.4 GHz band, there are other interference sources, e.g. Bluetooth, microwave, and processor noise.

Therefore, to improve channel assessment in the 2.4 GHz band, both OFDM and DSSS/CCK traffic can be monitored on the extension channel as well as on the channel adjacent to the extension channel (i.e. the extended channel). Thus, the channel assessment can cover 20-25 MHz. This channel assessment can be advantageously performed when listening for 20/40 MHz packets and when decoding 20 MHz packets (i.e. when not decoding 40 MHz packets). Channel assessment can be performed using four methods, either individually or in combination.

In a first method, the power level above the noise floor on the extension channel and the extended channel can be measured. Specifically, a heavily averaged power level (RSSI) can be reported to software. This first method can advantageously detect all interference types, detect radar on the extension channel, and determine channel load (i.e. the percentage of busy time on the channel). In one embodiment, the first method can further include compiling statistics from performing CCA on the extension channel and the extended channel.

In a second method, a spectral measurement of the extension channel and the extended channel can be done. In one embodiment, the signal on the extension channel (25 MHz) can be rotated and filtered and a 16-point (or 32-point) FFT can be performed on the 40 MHz baseband signal to sample the extension channel spectrum every 2.5 MHz (or 1.25 MHz). A heavily averaged power spectrum can be used to distinguish traffic types. For example, if the spectrum shows an ~20 MHz signal when not decoding a 40 MHz packet, then there is other 802.11g (OFDM or DSSS/CCK) traffic on the extension channel (or the extended channel). (Note that it is difficult to distinguish OFDM packets from DSSS/CCK packets based on the spectrum because the sharp edges of the OFDM spectrum are smoothed by transmitter and receiver analog filters and multipath channel effects.) The spectrum measurement can also distinguish narrowband signals that are non-802.11g interference. Thus the second method can advantageously detect and may distinguish different types of interference. Note that the analog filter bandwidth can limit the detection of interference having a wider bandwidth (e.g. >20 MHz). The spectrum measurement can also show which blocker channel has a signal by comparing the energy in the non-overlapping parts of the blocker channels.

In a third method, both OFDM and DSSS/CCK packet preambles can be searched for on the extension channel and the extended channel. For OFDM preamble detection, the extension channel and the extended channel can be rotated and filtered and then self-correlation can be performed on the resulting baseband signal. Note that the OFDM short preamble on the two channels cannot be distinguished in this method since they are just frequency offset by 5 MHz.

For DSSS/CCK preamble detection, the extension channel and the extended channel can be rotated and filtered by a matching raised-cosine filter. After this filtering, a Barker code cross-correlation based detection can be performed on the resulting baseband signal. In one embodiment, two parallel filter and Barker correlation paths can be used for each of the blocker channels, thereby ensuring identification of the blocker channel having DSSS/CCK traffic. The detection statistics, such as detection frequency, can then be sent to software for further processing. The third method can detect 802.11a/b/g interference and identify 2.4 GHz blocker channels for OFDM and DSSS/CCK packets.

In a fourth method, cyclic prefix correlation can be performed. In this method, the signals on the extension channel and the extended channel can be rotated and filtered and then cyclic prefix correlation can be performed over 0.8 μs baseband data separated by 3.2 μs (the period of the correlation peak being 4.0 μs). If this correlation shows periodic peaks with the 4.0 μs period when not decoding a 40 MHz packet, then logically there is other 802.11g OFDM traffic on the extension channel (or the extended channel). The fourth method can detect OFDM interference and determine channel load. In one embodiment, the second and fourth method can be combined to provide information of which channel has traffic and whether that traffic is OFDM or DSSS/CCK packets.

To detect 802.11n short GI packets, the cyclic prefix correlation can instead be performed over 0.4 μs separated 3.2 μs (the period of the correlation peak being 3.6 μs). To detect other (e.g. turbo-mode) packets, the cyclic prefix correlation can be performed over 0.4 μs separated 1.6 μs (the period of the correlation peak being 2 μs). In general, the fourth method can be used to detect any OFDM type packet with any guard interval length and any symbol period. For example, guard intervals of 0.8 μs or 0.4 μs as well as symbol periods of 7.2 μs or 6.8 μs (that is 6.4 μs (IFFT/FFT period)+guard interval).

Table 1 provides a summary and comparison of the four channel assessment methods.

TABLE 1

SUMMARY OF CHANNEL ASSESSMENT METHODS

| # | Interference type | 2.4 GHz blocker channel ID | Channel load (% of busy time) | Radar detection on the extension channel | Computation complexity |
|---|---|---|---|---|---|
| 1 | All, but cannot distinguish | No | Yes | Yes | Multiplication, Accumulation |
| 2 | All, may distinguish different types | Yes | Yes | No | FFT, Averaging |
| 3 | 11a/b/g only | Yes | No | Yes | Self-correlation, Cross-correlation |
| 4 | 11a/g OFDM only | No | Yes | Yes | Multiplication, Accumulation |

In summary, the first method is the most straightforward way to implement extension channel assessment and provides most of the useful information (i.e. detection of interference and the channel load). The second method can supplement that information by identifying 2.4 GHz blocker channels and potentially identify different types of interference. The third method has some significant limitations. Specifically, the third method is effective only during the preamble portion of the packet, thereby limiting the amount of averaging that can be performed. Moreover, the preamble may be completely missed due to a collision. Therefore, the third method is typically used as a supplemental method to identify DSSS/CCK packets (which have much longer preamble than OFDM packets). The fourth method can identify OFDM packets to assist in 5 GHz radar detection or help choosing the protection scheme at 2.4 GHz.

At 5 GHz, the interference on the extension channel is either OFDM (11a, 11n, or turbo packets)(wherein a turbo packet refers to an 80 MHz packet, i.e. twice as fast as a standard 802.11a packet) or radar events (i.e. non-OFDM traffic). As indicated above, software can look for periodicity (e.g. (1) very short, but large pulses or (2) large signals without OFDM cyclic prefix property) to detect radar events. In contrast, at 2.4 GHz, the interference on the extension channel can be one of the following: OFDM (11g, 11n, or turbo packets), DSSS/CCK on either one of the blocker channels, or other interference. In one embodiment, statistical information (e.g. histograms) can be reported to the software every ~0.1 sec.

Because the duration of the power measurement is 8 μs, this unit can be used as a slot unit. For example, statistics can be shown in a histogram report, which can be in the form of the number of slots in each or a subset of the various categories (discussed below). If any of the categories is known to be not present, then the associated detection mechanism and the corresponding statistical reporting can be disabled. For example, turbo packet detection can be disabled if the control and extension channel are not on a possible turbo channel.

FIG. 6 illustrates exemplary traffic detection categories for the 5.0 GHz band. A category 601 can be provided for no traffic or when power is close to noise floor. A category 602 can be provided for received 40 MHz signal. A category 603 can be provided for small OFDM signals. A category 604 can be provided for medium OFDM signals. A category 605 can be provided for large OFDM signals. In one embodiment, the ranges for small, medium, and large signals can be software programmable. For example, an entire signal range (e.g. from sensitivity −93 dBm to maximum input size −20 dBm) could be divided into three equal regions. A category 606 can be provided for radar.

Note that sub-categories can be provided within categories 603, 604, and 605. For example, a first sub-category could include an 802.11a or 802.11n, 0.8/0.4 μs guard interval, having a 3.2/6.4 μs IFFT/FFT period, if present. A second sub-category could include a proprietary turbo mode. A third sub-category could sub-divide the signal region into N equally spaced smaller ranges and record the occurrence per range. In one embodiment, the combination of the first and second sub-categories can equal the complete third sub-category.

FIG. 7 illustrates exemplary traffic detection categories for the 2.4 GHz band. A category 701 can be provided for no traffic or when power is close to noise floor. A category 702 can be provided for actively received 40 MHz signal. A category 703 can be provided for small signals (OFDM and DSSS/CCK). A category 704 can be provided for medium signals. A category 705 can be provided for large signals.

Note that sub-categories can be provided within categories 703, 704, and 705. For example, a first sub-category could include OFDM signals, i.e. an 802.11g or 802.11n, 0.8/0.4 As guard interval, having a 3.2/6.4 μs IFFT/FFT period, if present on a 20 MHz blocker channel. A second sub-category could include OFDM signals, i.e. an 802.11g or 802.11n, 0.8/0.4 As guard interval, having a 3.2/6.4 μs IFFT/FFT period, if present on a 25 MHz blocker channel. A third sub-category could include DSSS/CCK signals on a 20 MHz blocker channel. A fourth sub-category could include DSSS/CCK signals on a 25 MHz blocker channel. A fifth sub-category could include a proprietary turbo mode. A sixth sub-category could include narrowband interference. A seventh sub-category could include wideband interference (defined as none of the above). An eighth sub-category could sub-divide the signal region into N equally spaced smaller ranges and record the occurrence per range. In one embodiment, the combination of the first through seventh sub-categories can equal the complete eighth sub-category. Note that in one embodiment, for one or both of the categories listed in FIGS. 6 and 7, the small, medium, and large signal traffic detection categories can be set by software programmable thresholds.

Because spectral and cyclic prefix measurements require longer averaging than power measurements, and the decisions are based on measurements normalized by power, those measurements need to be reset whenever there is a power step. (Note that power steps of the control channel can correspond to AGC adjustments, whereas the power steps of the extension channel can correspond to filtered power measurements, which are measured separately from AGC adjustments.) Additionally, because longer averaging results in more reliable detection, it is desirable to keep averaging until the traffic type changes. Based on the assumption that different types of traffic will show up with different power levels or will be separated by at least a short inter-frame space (SIFS) (10 μs for 802.11g and 16 μs for 802.11a), power measurement can be used to detect the change of traffic type. To save power, the spectral and cyclic prefix measurements and averaging can stop when a maximum averaging length is reached, i.e. when a reliable decision can be made. In one embodiment, to ensure such reliability, the spectral and cyclic prefix measurements and averaging periodically can be periodically performed even if the power level remains the same.

The report to software, which can be obtained by a software poll, can include the relative histogram of a set of the above-described traffic categories. In one embodiment, a first register can be used for each category and a second register can be used for the total slot count. Self re-scaleable registers (i.e. registers that do not roll over or saturate, but rather use a time weighted average to maintain the ratios of these counter registers) can be used to prevent overflow in counting, i.e. when the total slot count register is approaching saturation, all registers are shifted to the right by a bit. In another embodiment, shadow registers can be used to allow atomic reading of the data, which does not require the freezing the registers, thereby effectively eliminating the possibility of lost events.

In addition to the statistical reporting, the software can poll for the current snapshot of the spectrum measurement or request a snapshot of the spectrum measurement of a certain traffic category. This polling is useful when the software needs more detailed information for identifying other traffic types or for debugging.

Based on the statistics of the extension channel availability, the software can use various methods to avoid stomping other 802.11 networks. In one embodiment, these statistics can be based on the statistics from the access point (AP) and/or the statistics from the majority of the stations (STAs) through feedback. In a first method, the 40 MHz mode can be disabled, thereby allowing operation solely in 20 MHz mode. In a second method, the access point can choose to check the availability of the extension channel on the other side of the control channel. In a third method, if the 40 MHz rates are part of the overall rate adaptation table, then 40 MHz rates can be chosen for an individual station (STA) separately. In a fourth method, a protection scheme can be chosen adaptively. An exemplary protection schemes could include sending a CTS on the control and extension channels. In one typical embodiment, duplicated OFDM preambles and signal fields can be used.

FIG. 8 illustrates a table 800 that summarizes exemplary characteristics of the dynamic 20/40 MHz method/device described above. As noted in table 800, in the 5 GHz band, 802.11a OFDM traffic can be monitored on the extension channel. In the 2.4 GHz band, 802.11g OFDM and DSSS/CCK traffic can be monitored on both the extension channel and the extended channel (thereby taking into account both 20 MHz and 25 MHz spacing). In the 5 GHz band, CCA can be performed and legacy preambles can be provided on both the control and extension channels for protection. In the 2.4 GHz band, CCA can be performed and legacy preambles as well as RTS/CTS packets can be provided on both the control and extension channels for protection. In the 5 GHz band, radar detection can be performed independently for both the control and extension channels. No radar detection is performed in the 2.4 GHz band.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

Figure 9:
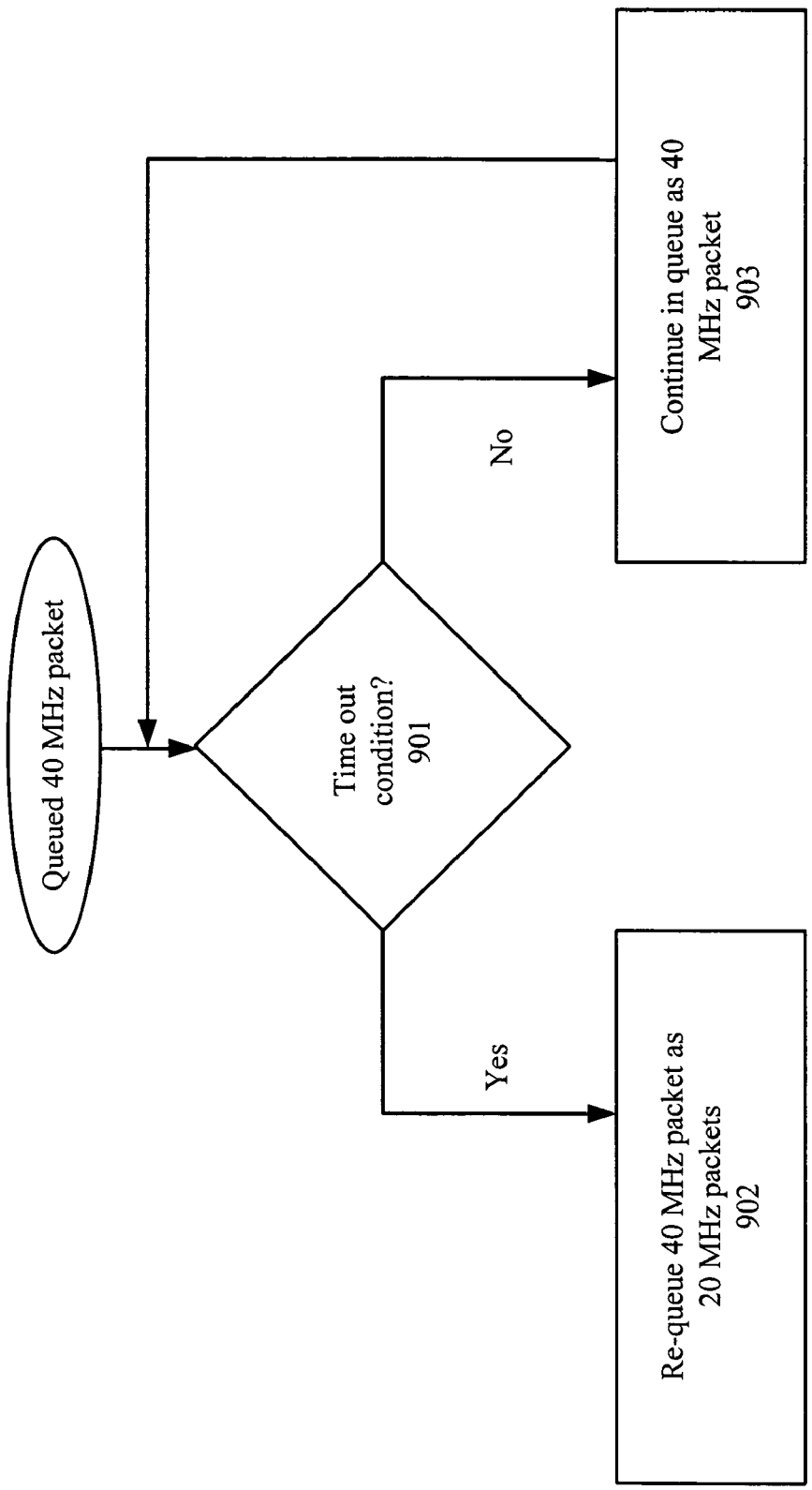
FIG. 9 illustrates an exemplary transmitter process for re-queuing 40 MHz packets as two 20 MHz packets.

For example, a transmitter can explicitly queue its packets as either 20 MHz or 40 MHz. In one embodiment, packets queued as 40 MHz could not be transmitted as 20 MHz. In another embodiment shown in FIG. 9, a packet queued as 40 MHz could encounter a time out condition (due to exceeding a predetermined waiting-for-transmission time or encountering a busy/noisy extension channel) as determined in step 901. At this point, step 902 can re-queue that 40 MHz packet as one or more 20 MHz packets. If a time out condition is not encountered, the packet can remain in the queue as a 40 MHz packet in step 903. Then, the process can return to step 901 to check for time out conditions.

Figure 10:
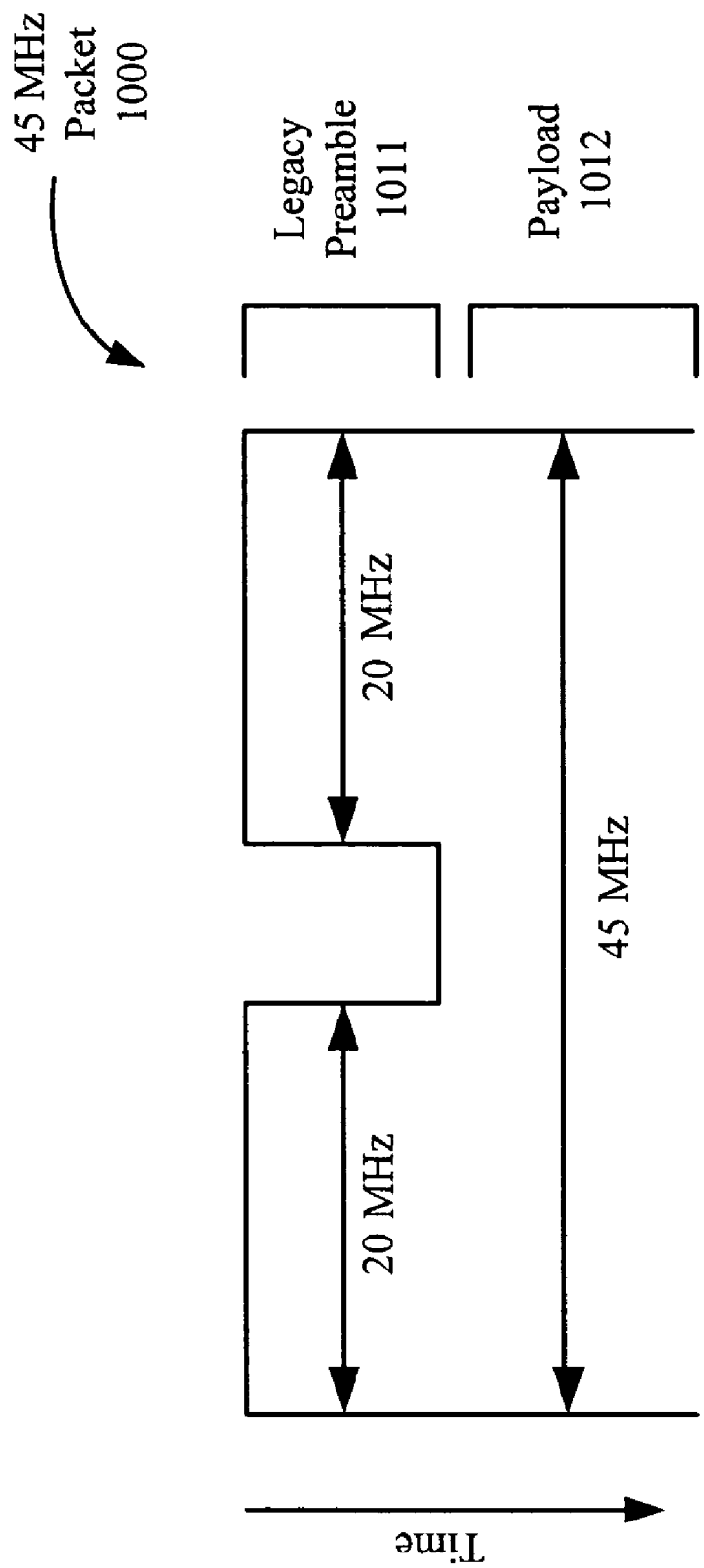
FIG. 10 illustrates an exemplary configuration of at least two adjacent, non-overlapping channels that can be used to provide a wide communication channel.

Note that the dynamic switching on a packet by packet basis can be generically applied to any first and second bandwidth. That is, the dynamic switching can be done between a first signal having a first bandwidth and a second signal having a second bandwidth, wherein the second signal is provided on multiple adjacent non-overlapping channels and the second bandwidth is at least twice the first bandwidth. For example, FIG. 10 illustrates an exemplary configuration of at least two adjacent, non-overlapping channels that can be used to provide a wide communication channel. In this configuration, a 45 MHz packet 1000 can include a legacy preamble 1011 having two 20 MHz components with a 5 MHz separation whereas the payload 1012 can have a continuous bandwidth of 45 MHz.

In one embodiment, hardware reports can also include the "medium sensing time histogram report" as specified in 802.11k. Note that use of the terms "receiver" and "transmitter" refers to functionality and not necessarily to specific devices. For example, many wireless networks use transceivers, which have both receiving and transmitting capabilities. Note further that references to hardware, software, the PHY layer etc. can apply equally to receivers, transmitters, transceivers, access points (APs), and stations.

In one embodiment, to avoid hardware overhead, there is no parallel receiver (including frequency offset and channel estimation, demodulation, Viterbi decoder etc.) running on the extension channel. However, this embodiment does not allow 20 MHz packets to be detected on the extension channel, if this function is desired.

Note that multi-chain MRC (multi-receive combining) can be done for both the control and extension channel if the hardware is multi-chain capable. Specifically, if two receivers are similarly equipped, then both of the control channel segments can be combined and, similarly, both of the extension channel segments can be combined. These combined segments can then be processed as if a single receiver had received the combined control channel segment and the combined extension channel segment.

Further note that it is possible that the 20/40 MHz bit stored in a HI-SIG field can be used for a secondary detection check. Specifically, depending on hardware implementation issues such as the high throughput SIGNAL (HT-SIG) detection latency, this bit is likely unavailable during the HT short training field (HT-STF), which would form part of a preamble.

Accordingly, it is intended that the scope of the invention be defined by the following Claims and their equivalents.

The invention claimed is:

1. A method of communicating on a wireless network, the method comprising:
   using a receiver,
   converting a received signal to baseband frequency;
   switching dynamically on a packet by packet basis between a 20 MHz signal and a 40 MHz signal, wherein the 40 MHz signal is provided on adjacent non-overlapping channels; wherein one of the adjacent non-overlapping channels is designated a control channel and another of the adjacent non-overlapping channels is designated an extension channel, and further including monitoring traffic on the extension channel; and
   processing the received signal based on whether the received signal is one of the 20 MHz signal and the 40 MHz signal.

2. The method of claim 1, wherein the 40 MHz signal includes two legacy preambles having a spacing of 20 or 25 MHz.

3. The method of claim 1, wherein the traffic includes OFDM signals.

4. The method of claim 1, further including monitoring traffic on an extended channel, the extended channel being adjacent the extension channel.

5. The method of claim 4, wherein the traffic can include OFDM and DSSS/CCK signals.

6. A method of communicating on a wireless network, the method comprising:
   using a transmitter,
   generating a 20 MHz signal and a 40 MHz signal;
   switching dynamically on a packet by packet basis between the 20 MHz signal and the 40 MHz signal, wherein the 40 MHz signal is provided on adjacent non-overlapping channels, and wherein the 40 MHz signal includes a packet on each of the adjacent non-overlapping channels;
   protecting the 40 MHz signal when spacing between the packets is 25 MHz; and
   transmitting the 20 MHz signal and the 40 MHz signal.

7. A method of communicating on a wireless network, the method comprising:
   using a transmitter,
   generating a 20 MHz signal and a 40 MHz signal;
   switching dynamically on a packet by packet basis between the 20 MHz signal and the 40 MHz signal, wherein the 40 MHz signal is provided on adjacent non-overlapping channels, and wherein the 40 MHz signal includes a packet on each of the adjacent non-overlapping channels;
   protecting the 40 MHz signal whether the spacing is 20 or 25 MHz; and
   transmitting the 20 MHz signal and the 40 MHz signal.

8. A method of communicating on a wireless network, the method comprising:
   using a transmitter,
   generating a 20 MHz signal and a 40 MHz signal;
   switching dynamically on a packet by packet basis between the 20 MHz signal and the 40 MHz signal, wherein the 40 MHz signal is provided on adjacent non-overlapping channels, and wherein the 40 MHz signal includes a packet on each of the adjacent non-overlapping channels;
   sending an RTS/CTS signal on each of the adjacent non-overlapping channels for the 40 MHz signal; and
   transmitting the 20 MHz signal and the 40 MHz signal.

9. The method of claim 8, wherein the RTS/CTS signals overlap.

10. A method for communicating on a wireless network, the method allowing dynamic switching between 20 MHz and 40 MHz signals on a packet by packet basis, the method comprising:
   determining whether conditions for a 40 MHz signal are met;
   if the conditions for the 40 MHz signal are met, then processing the signal as a 40 MHz signal;
   determining whether conditions for a 20 MHz signal are met;
   if the conditions for the 20 MHz signal are met, then processing the signal as a 20 MHz signal; and
   if neither of the conditions for the 40 MHz signal nor the conditions for 20 MHz signal are met, then resuming monitoring channels in the wireless network.

11. A method for communicating on a wireless network, the method allowing dynamic switching between 20 MHz and 40 MHz signals on a packet by packet basis, the method comprising:
   determining whether conditions for a 40 MHz signal are met;
   if the conditions for the 40 MHz signal are met, then processing the signal as a 40 MHz signal;
   determining whether conditions for a 20 MHz signal are met;
   if the conditions for the 20 MHz signal are met, then processing the signal as a 20 MHz signal; and
   if neither of the conditions for the 40 MHz signal nor the conditions for 20 MHz signal are met, then resuming monitoring channels in the wireless network,
   wherein determining whether conditions for the 40 MHz signal includes:
   finding a signal set that results in a predetermined gain adjustment; and
   verifying that each channel carrying the signal set has a power step and that the difference between the power steps is less than a predetermined threshold.

12. The method of claim 11, wherein determining whether conditions for the 40 MHz signal further includes:
   verifying that a signal on each channel passes one of self-correlation and cross-correlation.

13. A method for communicating on a wireless network, the method allowing dynamic switching between 20 MHz and 40 MHz signals on a packet by packet basis, the method comprising:

determining whether conditions for a 40 MHz signal are met;
if the conditions for the 40 MHz signal are met, then processing the signal as a 40 MHz signal;
determining whether conditions for a 20 MHz signal are met;
if the conditions for the 20 MHz signal are met, then processing the signal as a 20 MHz signal; and
if neither of the conditions for the 40 MHz signal nor the conditions for 20 MHz signal are met, then resuming monitoring channels in the wireless network,
wherein determining whether conditions for the 40 MHz signal includes:
detecting a weak signal set on designated channels; and
verifying that each channel carrying the weak signal set passes self-correlation.

14. A method for communicating on a wireless network, the method allowing dynamic switching between 20 MHz and 40 MHz signals on a packet by packet basis, the method comprising:
determining whether conditions for a 40 MHz signal are met;
if the conditions for the 40 MHz signal are met, then processing the signal as a 40 MHz signal;
determining whether conditions for a 20 MHz signal are met;
if the conditions for the 20 MHz signal are met, then processing the signal as a 20 MHz signal; and
if neither of the conditions for the 40 MHz signal nor the conditions for 20 MHz signal are met, then resuming monitoring channels in the wireless network,
wherein determining whether conditions for the 20 MHz signal includes:
detecting a weak signal set on designated channels, the designated channels including a control channel and an extension channel; and
verifying that a signal on the control channel passes self-correlation and a signal on the extension channel fails self-correlation.

15. A wireless device capable of dynamically switching between 20 MHz and 40 MHz signals on a packet by packet basis, the wireless device comprising:
means for determining whether conditions for a 40 MHz signal are met;
means for processing the signal as a 40 MHz signal if the conditions for the 40 MHz signal are met;
means for determining whether conditions for a 20 MHz signal are met;
means for processing the signal as a 20 MHz signal if the conditions for the 20 MHz signal are met; and
means for resuming monitoring channels if neither of the conditions for the 40 MHz signal nor the conditions for 20 MHz signal are met.

16. The wireless device of claim 15, further including means for monitoring a secondary channel for traffic, the means for monitoring facilitating decision making in the means for determining whether conditions for the 40 MHz signal are met.

17. A method of communicating on a wireless network, the method comprising:
using a transceiver, switching dynamically on a packet by packet basis between a first signal having a first bandwidth and a second signal having a second bandwidth, wherein the second signal is provided on multiple adjacent non-overlapping channels,
wherein for a receiver portion of the transceiver, further including determining if a received signal is one of the first signal and the second signal, and then processing the received signal based on whether the received signal is the first signal or the second signal, and
wherein for a transmitter portion of the transceiver, further including generating a plurality of the first signals and a plurality of the second signals, and transmitting the plurality of the first signals and the plurality of the second signals.

18. The method of claim 17, wherein the second bandwidth is at least twice the first bandwidth.

19. The method of claim 17, further including for the transmitter portion, protecting the first and second signals by sending RTS/CTS signals having a combined bandwidth substantially equal to the first and second bandwidths.

20. The method of claim 19, wherein the RTS/CTS signals overlap.

21. A method of dynamically transmitting 20 and 40 MHz signals in a wireless network on a packet by packet basis, the method comprising:
using a transmitter,
performing clear channel assessment (CCA) on a control channel and an extension channel only when a queued signal is a 40 MHz signal; and
broadcasting request to send (RTS)/clear to send (CTS) packets on the control channel and the extension channel if the queued signal is a 40 MHz signal.

22. A method of dynamically transmitting 20/40 MHz signals in a wireless network on a packet by packet basis, the method comprising:
using a transmitter,
queuing packets as either 20 MHz or 40 MHz packets;
determining that a 40 MHz packet has a time out condition; and
transmitting the 40 MHz packet as a 20 MHz packet.

23. The method of claim 22, wherein the timeout condition includes a waiting-for-transmission time that exceeds a predetermined time or a busy/noisy extension channel.

24. A method of facilitating dynamic switching between 20 MHz and 40 MHz communication in a wireless network, the method comprising:
using a transmitter,
compiling statistics regarding an extension channel, wherein the extension channel provides one portion of a 40 MHz packet and a control channel provides another portion of the 40 MHz packet; and
using the statistics to determine whether the extension channel should be used for transmitting the 40 MHz packet.

25. The method of claim 24, wherein compiling the statistics includes performing clear channel assessment (CCA) on the extension channel.

26. The method of claim 24, wherein compiling the statistics includes measuring a power level above noise.

27. The method of claim 24, wherein compiling the statistics includes performing a spectral measurement.

28. The method of claim 24, wherein compiling the statistics includes detecting OFDM preambles and DSSS/CCK preambles.

29. The method of claim 24, wherein compiling the statistics includes performing cyclic prefix correlation.

30. The method of claim 24, further including compiling statistics regarding an extended channel, which is adjacent the extension channel.

* * * * *